US006701711B1

United States Patent
Litwin (10) Patent No.: US 6,701,711 B1
(45) Date of Patent: Mar. 9, 2004

(54) MOLTEN SALT RECEIVER COOLING SYSTEM

(75) Inventor: Robert Z. Litwin, Canoga Park, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/291,927

(22) Filed: Nov. 11, 2002

(51) Int. Cl.[7] .................................................. F03G 6/00
(52) U.S. Cl. .................................. 60/641.11; 60/641.15
(58) Field of Search ........................ 60/641.8, 641.11, 60/641.15

(56) References Cited

U.S. PATENT DOCUMENTS

| 439,888 A | 11/1890 | McElroy |
| 1,814,897 A | 7/1931 | Coxe |
| 3,596,034 A | 7/1971 | Mekejean |
| 4,046,136 A | 9/1977 | Izumi et al. |
| 4,216,764 A | 8/1980 | Clark |
| 4,407,269 A | 10/1983 | Hopper |
| 4,430,241 A | 2/1984 | Florucci |
| 4,438,630 A | * 3/1984 | Rowe ........................... 60/676 |
| 4,643,212 A | 2/1987 | Rothrock |
| 4,668,494 A | * 5/1987 | Van Hook .................. 423/392 |
| 5,366,514 A | * 11/1994 | Becnel et al. ................. 23/303 |
| 5,417,052 A | 5/1995 | Bharathan et al. |
| 5,444,972 A | * 8/1995 | Moore ..................... 60/39.182 |

\* cited by examiner

Primary Examiner—Hoang Nguyen
(74) Attorney, Agent, or Firm—Alston & BIrd LLP (57) ABSTRACT

A flow of molten salt is provided through a solar-thermal heat exchange receiver. The receiver converts solar energy, reflected from heliostats, to thermal energy that is stored in molten salt. A vessel holds a store of molten salt for cooling the receiver upon a loss of flow. At the outlet of the receiver, an air separator removes air entrained in the flow of molten salt. From the air separator, the flow of molten salt proceeds through a downcomer having flow obstacles to a hot storage tank.

38 Claims, 5 Drawing Sheets

MOLTEN SALT RECEIVER COOLING SYSTEM

FIELD OF THE INVENTION

The present inventions relate to solar-thermal receiver systems, and, more particularly, to molten salt receiver systems having a cooling system to provide cooling upon a predetermined flow condition to permit redirecting heliostats from the receiver heat exchanger.

BACKGROUND OF THE INVENTION

Figure 1:
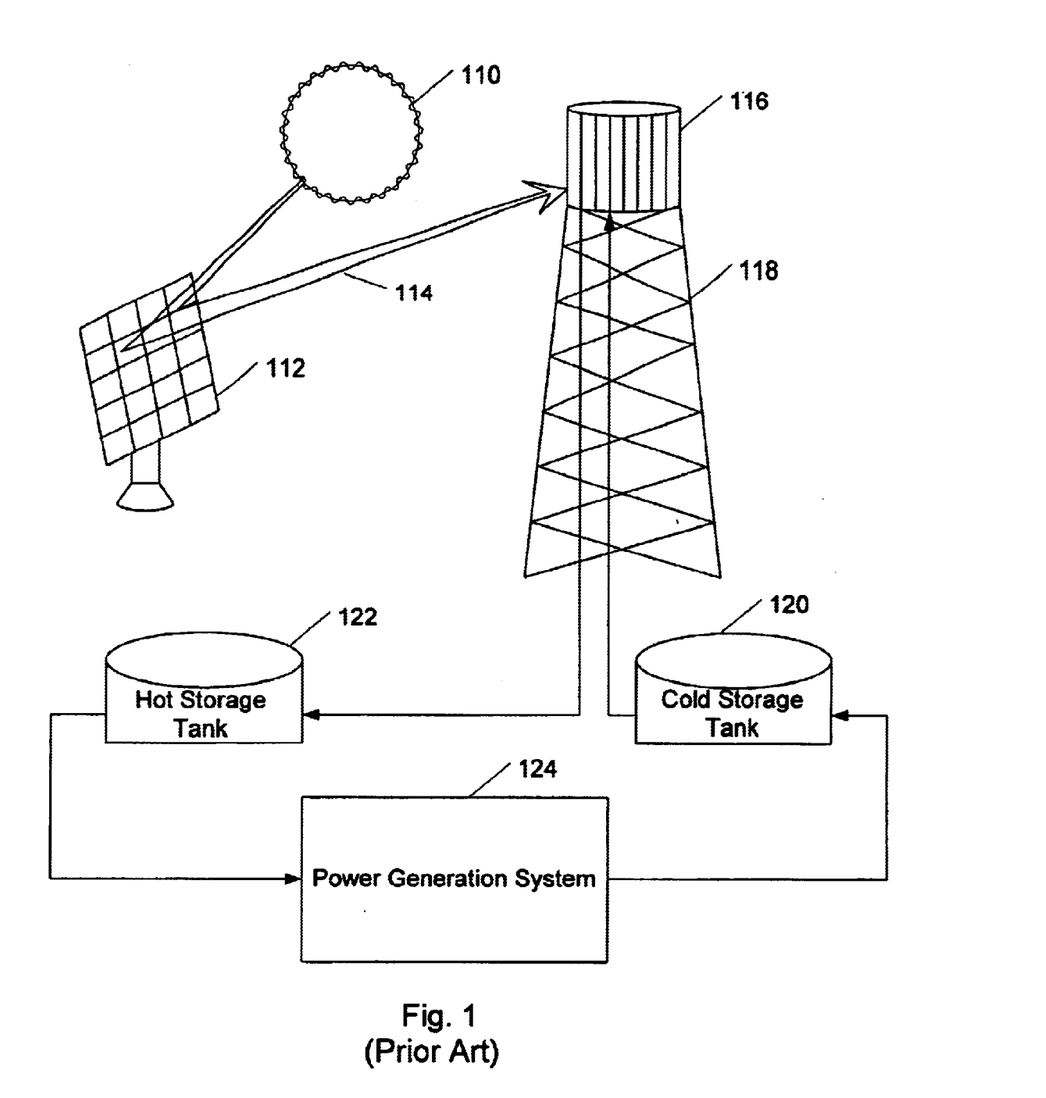
FIG. 1 is a schematic of a known solar-thermal tower molten salt receiver system.

Molten salt receiver systems are used in solar-thermal energy conversion systems. One of the most common applications of the molten salt system applies to solar tower systems such as is described in U.S. Pat. No. 5,417,052 to Bharathan et al. A similar system is generally depicted in FIG. 1 illustrating an array or a field of heliostats 112 that follow the sun 110 and re-direct the solar radiation 114 to a central receiver system located atop a tower 118.

The central receiver system typically has a receiver heat exchanger 116 that becomes heated by the reflected solar energy 114. The heat is transferred to a molten salt, typically nitrate salts such as a combination of liquid sodium nitrate and potassium nitrate. The heated molten salt is directed to a hot storage tank 122 that provides energy to a power generation system 124. The molten salt is returned to a cold storage tank 120 that supplies the central receiver system. In the power generation system 124, the molten salt exchanges heat through a heat exchanger to a fluid such as water or air. For example, as described in the Bharathan patent, the molten salt is directed to an air heater that drives a hybrid gas power plant. A gas turbine converts the thermal energy into mechanical energy, which is then converted into electrical energy by a generator.

In molten salt receiver systems, the molten salt is not only a thermal storage fluid but also functions as a coolant that reduces the temperature of the receiver heat exchanger 116. If the flow of molten salt is inadvertently reduced or terminated, the solar energy will quickly overheat the receiver heat exchanger 116. In such a situation, it is desirable to defocus the heliostats 112 by moving them to a standby position so that solar energy is not directed toward the receiver heat exchanger 116. However, an adequate supply of molten salt must be available to cool the receiver heat exchanger 116 for the amount of time required to redirect the heliostats 112.

Figure 2:
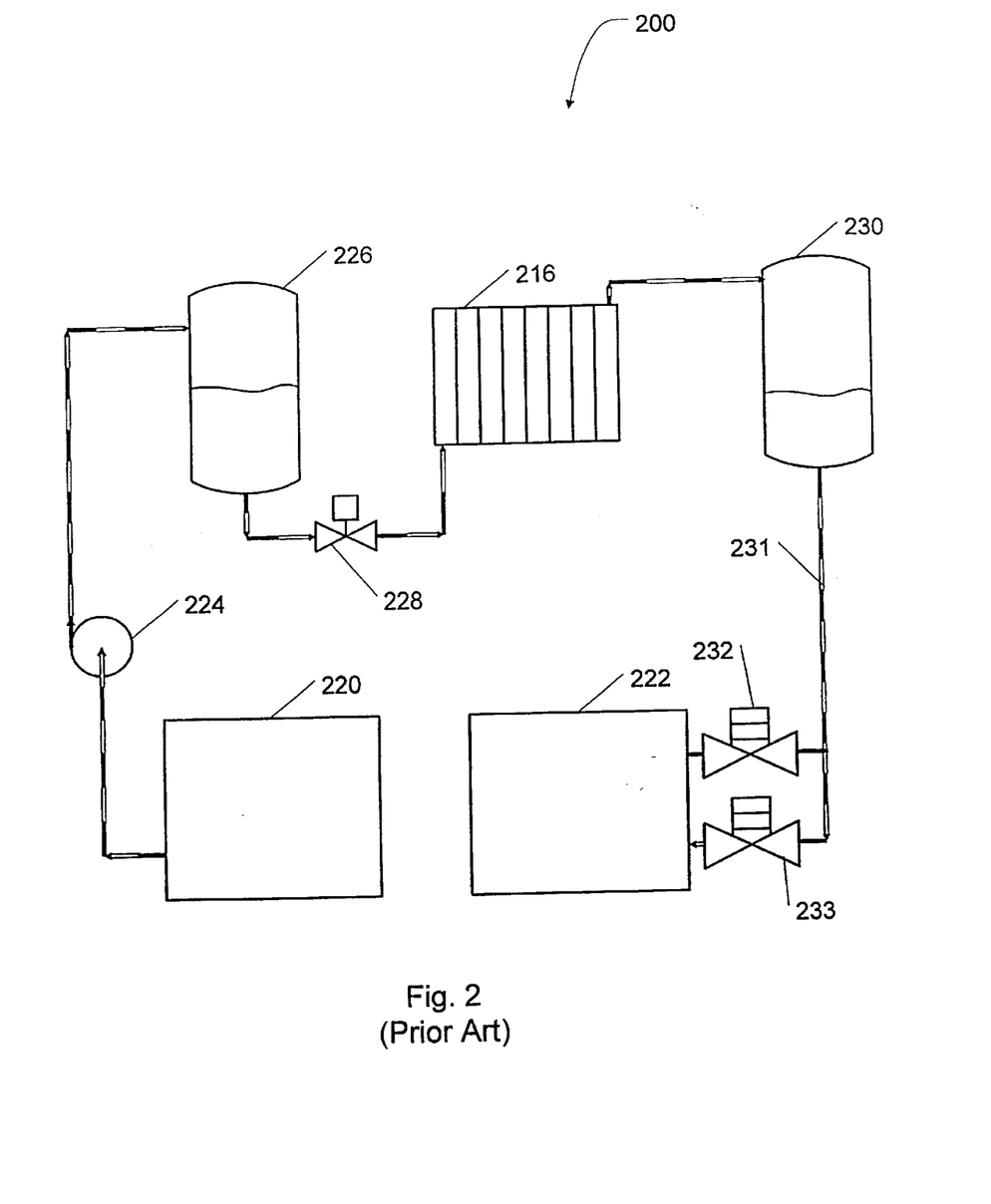
FIG. 2 is a simplified fluid communication diagram of a prior art molten salt receiver system.

One molten salt receiver system 200 was devised to cause cooling while redirecting heliostats and is rather simply described by FIG. 2. In this system, molten salt storage tanks 220, 222 were located at ground level. A cold storage tank 220 stored the supply of cold molten salt to be sent to the receiver heat exchanger 216, and a hot storage tank 222 stored hot molten salt for use in an energy generation system. A variable speed pump 224 provided molten salt from the cold storage tank 220 to a pressurized receiver inlet vessel 226, which physically sat level to or slightly below the receiver heat exchanger 216. The receiver inlet vessel 226 supplied flow of molten salt to the receiver heat exchanger 216 by way of a controlled throttle valve 228. The throttle valve 228 controlled flow through the heat exchanger 216 based upon optimum heat exchange conditions. Typically, flow is throttled to maintain a receiver heat exchanger 216 outlet temperature of about 1050° F. After flowing through the receiver heat exchanger 216, molten salt entered a receiver outlet vessel 230, which sat physically slightly higher than the receiver heat exchanger 216. The outlet vessel 230 was vented to atmosphere and permitted the release of entrained air in the molten salt. From the receiver outlet vessel 230, a downcomer 231 provided the flow of molten salt to a hot storage tank 222.

In this molten salt receiver system 200, the downcomer 231 required a full head of molten salt in order to avoid the effects of potentially destructive rapid momentum changes to the flow. The receiver outlet vessel 230 included a level indicator (not shown) assuring that the downcomer 231 was full. Feedback controlled active drag valves 232, 233 were located at the base of the downcomer 231 and maintained the head. At least two active drag valves 232, 233 were provided for redundancy. As such, the drag valves 232, 233 were controlled by feedback from the level indicator at the receiver outlet vessel 230.

The pressurized receiver inlet vessel 226 served an emergency cooling purpose in the system 200. The receiver inlet vessel 226 provided a flow of molten salt for cooling the receiver heat exchanger 216 in the event of loss of normal flow. When flow ceases, the heliostats are required to be redirected from the receiver heat exchanger 216, a process that typically takes about one minute. In order to avoid overheating the receiver heat exchanger 216, the flow from the receiver inlet vessel 226 must be provided during this one minute. Therefore, the level of the inlet vessel 226 was maintained at a predetermined value to keep at least a minute's worth of supplemental molten salt flow.

Because the drag valves 232, 233 were actively opened by a control system, they could inadvertently close. In the absence of free space in the outlet vessel 230, the inadvertent shutting of the drag valves 232, 233 could prevent flow of the molten salt through the receiver heat exchanger 216. As such, the level in the receiver outlet vessel 230 required available free space to accept the required amount of flow from the receiver inlet vessel 226 during the one minute period required to redirect the heliostats.

From the foregoing description, it becomes apparent that there are several control variables involved in the molten salt receiver system 200. First, the flow through the heat exchanger 216 was controlled by the throttle valve 228 according to optimum heat exchange requirements, which vary greatly according to the intensity of sunlight throughout the day. In fact, cloud cover transients can have a sudden and dramatic effect on the temperature and necessary flow through the receiver heat exchanger 216. Secondly, the level of the receiver inlet vessel 226 was controlled to maintain an appropriate level as required to cool the receiver heat exchanger 216 in the event of loss of flow. A variable speed pump 224 supplying the receiver inlet vessel 226 maintained appropriate pressure in the vessel 226. Also, the variable speed pump 224 and an air feed and bleed cover gas system (not shown) maintained the appropriate level in the inlet vessel 226. As can be seen, controlling the receiver inlet vessel level was also dependent upon the throttled flow through the receiver heat exchanger 216, therefore affecting control of the speed of the pump 224. Thirdly, the level of the receiver outlet vessel 230 was required to be maintained in a band, high enough to indicate a full head in the downcomer 231, yet low enough to permit a minute's worth of volume to flow from the receiver inlet vessel 226 in the event of inadvertent drag valve 232, 233 closure. The drag valve 232, 233 controlled the level of the receiver outlet vessel 230 by feedback from the level indicator (not shown). As can be seen, the level of the receiver outlet vessel 230 is also dependent upon the flow through the heat exchanger 216.

The cross dependence of the control variables in the foregoing system created a rather elaborate and complex control system for the molten salt receiver system 200. As such, a need in the art exists for a less complex control system. However, the system must maintain the ability to provide adequate molten salt cooling to the receiver heat exchanger 216 in the event of a loss of flow. Additionally, the system must be capable of preventing momentum changes of the downcomer flow that can induce undesirable mechanical forces in the downcomer.

BRIEF SUMMARY OF THE INVENTION

Therefore according to the present inventions, a molten salt receiver system and method for cooling a receiver heat exchanger of a molten salt receiver are provided. According to one embodiment of the present invention, a system for cooling a receiver heat exchanger of a molten salt receiver system includes a molten salt holding vessel upstream of the receiver heat exchanger. The holding vessel contains a store of molten salt that is maintained at an appropriate temperature to cool the receiver heat exchanger. An air separator downstream of the receiver heat exchanger permits the release of air entrained in the molten salt flow from the receiver heat exchanger. A downcomer downstream of the air separator delivers molten salt to a molten salt energy generation system, which according to one aspect of the invention includes a storage tank. According to one aspect of the invention, the downcomer includes at least one flow obstacle. The flow obstacle, such as a passive flow restrictor or a turbine, permits controlled flow through the downcomer avoiding rapid flow and momentum changes in the molten salt. These momentum changes often create sudden and violent physical vibration of the downcomer and associated system. Passive flow restrictors include any of many commercially available flow restricting devices such as orifices, baffles, or open cell metal foam.

According to one aspect of a molten salt receiver system of the present invention, at least one isolation valve connects the holding vessel and the receiver heat exchanger. The isolation valve can open upon a predetermined flow condition in the system, which requires cooling of the receiver heat exchanger. Typically, these are low flow or loss of flow conditions. Such conditions are typically monitored by flow sensors or pump power supplies. A predetermined threshold may be established for each of these conditions, below which the isolation valve automatically opens. According to one aspect of the invention, the holding vessel has a capacity to supply a volume of molten salt corresponding to a volume required to cool the receiver heat exchanger for at least one minute. In this example, one minute is chosen as a minimum so that adequate time is provided to move heliostats that are providing thermal energy to the receiver heat exchanger. Of course, other embodiments may require more or less cooling time depending upon heat exchange characteristics of the receiver heat exchanger and the time required to redirect or defocus heliostats.

According to another aspect of the instant molten salt receiver system, a pressurization system is connected to the holding vessel and adapted to permit selective pressurization of the holding vessel. Other aspects of the pressurization system permit selective venting of the vessel, either by an overpressure relief or a controlled venting valve. As thus far described, both the holding vessel and the air separator are vented, and as such it is advantageous to include a vent system in the molten salt receiver system. Therefore, according to one aspect of the molten salt receiver system, the vent system vents the air separator and the holding vessel to a molten salt storage tank.

The present invention also includes other elements of a molten salt receiver system including a molten salt source. This tank is typically a cold tank for storing molten salt kept in fluid form. A molten salt pump receives molten salt from the molten salt source providing flow through the receiver heat exchanger. The outlet of the pump is interconnected to the outlet of the holding vessel. As such, the previously described isolation valve isolates the holding vessel from the flow of the pump through the receiver heat exchanger, that is until the isolation valve opens. Upon opening, the flow from the pump is supplemented by the holding vessel. Additionally, a flow control valve is downstream of the pump and controls the normal flow through the receiver heat exchanger.

Another embodiment of the present invention includes a method for cooling a receiver heat exchanger of a molten salt receiver system. The method comprises permitting flow of molten salt through the receiver heat exchanger. After the molten salt is passed through the heat exchanger, air entrained in the flow is released. The flow is then delivered to a molten salt energy generation system, such as a hot storage tank. The delivery of molten salt to the hot storage tank also includes passively restricting flow of molten salt. Passive restriction, as previously described, avoids undesirable effects of sudden fluid flow momentum changes.

The flow is also monitored to detect an occurrence of a predetermined flow condition, such as monitoring flow through the receiver heat exchanger. The predetermined flow condition may correspond to flow falling below a predefined threshold. Alternatively, the monitoring includes monitoring an electric pump power supply to detect a predetermined flow condition corresponding to loss of power to the pump. Upon the detection of the occurrence of the predetermined flow condition, the flow is automatically supplemented from a molten salt holding vessel. According to one aspect, the supplementation of flow is initiated by automatically opening a valve isolating the molten salt holding vessel. As described above, it is desirable to supplement flow for at least one minute. Therefore, the molten salt holding vessel is filled to a level corresponding to a volume required during the step of automatically supplementing flow.

BRIEF DESCRIPTION OF THE SEVERAL VIEWS OF THE DRAWINGS

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Referring once again to FIG. 1, a molten salt receiver heat exchanger 116 receives concentrated solar radiation 114 from a field of heliostats 112. The heliostats 112 (only one shown) have a plurality of reflective surfaces that reflect the solar energy to a receiver heat exchanger 116. Typically, molten salt receiver systems comprise tower type receiver systems, wherein the heat exchanger 116 sits atop a tower 118 centrally located within the field of heliostats 112. However, molten salt receiver cooling systems are not limited to tower type receiver systems and may be included in other types of molten salt heat exchange systems without departing from the scope or spirit of the present invention.

The transfer of solar radiation 114 to thermal energy is accomplished through an interconnected molten salt receiver system comprising a hot storage tank 122 and a cold storage tank 120. As used herein, when a device or element is "interconnecting" or "interconnected" to another device or element, it may be directly connected, attached, or connected by one or more intervening devices or elements. The very basic elements of a molten salt receiver system are simplistically depicted in FIG. 1 and include the cold storage tank 120 that supplies relatively cold molten salt to the receiver heat exchanger 116 by way of a pump (not shown in FIG. 1). Typically, the molten salt comprises a nitrate salt, and more specifically a mixture of 60% sodium nitrate and 40% potassium nitrate. However, other types and mixtures of molten salt may be used as a heat transfer and a thermal storage medium.

The receiver heat exchanger 116 transfers solar radiation to thermal heat storage in the molten salt and is subsequently stored in the hot storage tank 122. Both the cold storage tank 120 and the hot storage tank 122 generally lie at ground level in close proximity to the tower 118. Each storage tank 120, 122 is interconnected to a larger power generation system 124, the hot storage tank 122 supplying a store of thermal energy for later conversion by the power generation system 124, the cold storage tank 120 receiving molten salt expended by the power generation system 124 and supplying the molten salt for subsequent use in the receiver system. The power generation system 124 may include the system described in U.S. Pat. No. 5,417,052 to Bharathan et al. and incorporated herein by reference. However, many other power generation systems have been devised incorporating molten salt thermal energy transfer and conversion and may be implemented in conjunction with the described molten salt receiver system without departing from the spirit or the scope of the present invention.

Figure 3:
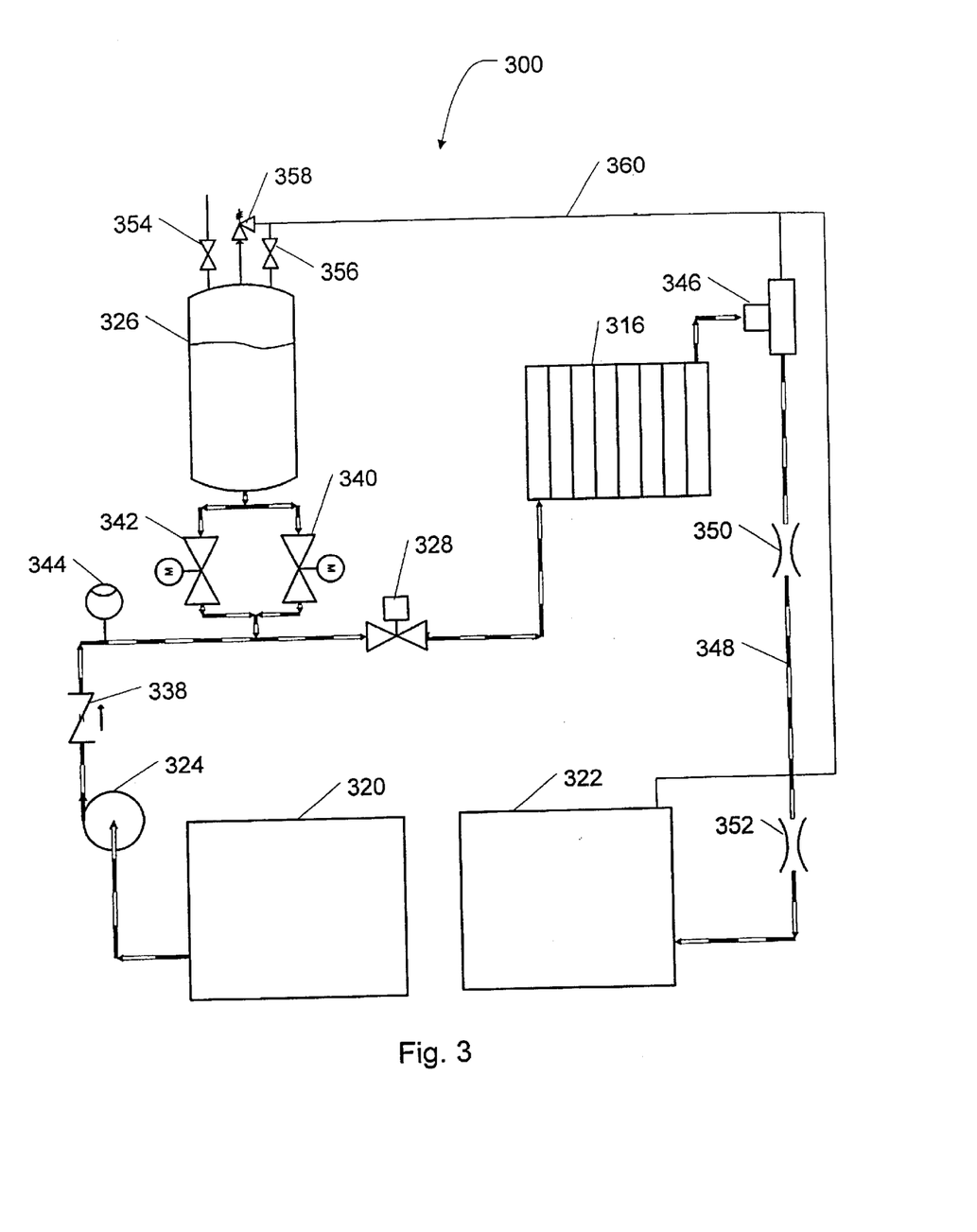
FIG. 3 is a simplified fluid communication diagram of a molten salt receiver system according to one embodiment of the present invention.

FIG. 3 represents one advantageous embodiment of the present molten salt receiver system 300. The system 300 comprises a cold storage tank 320 supplies a flow of molten salt to the top of a tower (not shown) by way of a pump 324 and a check valve 338. Located atop the tower are a receiver heat exchanger 316 and associated valves and piping. A throttle valve 328 regulates the flow of the molten salt from the pump 324 through the receiver heat exchanger 316. The throttle valve 328 may comprise redundant parallel throttle valves (not shown) for reliability. The flow through the receiver heat exchanger 316 is controlled by the throttle valve 328 according to the heat transfer requirements of the receiver heat exchanger 316. For example, cloud transients can have a dramatic effect on the differential temperature across the receiver heat exchanger 316 requiring sudden flow rate changes. Many control systems, such as constant outlet temperature control, differential temperature control, and average temperature control systems are known to those skilled in the art. In one embodiment, for example, a control system advantageously uses constant outlet temperature control maintaining the receiver heat exchanger outlet temperature at 1050° F. Any of these and other control systems can be implemented in conjunction with the molten salt receiver system of the present invention.

Also located atop the tower is an air separator 346 that is downstream of the receiver heat exchanger 316. The air separator 346 permits the release of air entrained in the molten salt. The air separator 346 may also be used for venting during fill and drain operations. In this embodiment, the air separator 346 is a typical T-shaped separator. The air separator 346 is also vented to a running vent system 360 that accepts the air released from the air separator 346. As shown in FIG. 3, the running vent system 360 is interconnected to a hot storage tank 322 and other venting valves, discussed in more detail below.

The air separator 346 is also connected to the hot storage tank 322 by way of the downcomer 348. The downcomer 348 supplies the flow of molten salt through a drop from the tower to the hot storage tank 322. According to one embodiment of the present molten salt receiver system this drop is about 300 feet. However, the height of downcomers will vary according to receiver system size and flow requirements. As such, the flow must be controlled to avoid drastic and sudden momentum changes as the molten salt freefalls through the downcomer 348. The momentum changes can have a damaging effect on the downcomer 348, connections to the downcomer and associated piping, valves, and instruments. To avoid damage, one or more flow obstacles are included in the downcomer 348. The obstacles may comprise passive restrictors 350, 352 such as orifices, baffles, or open cell metal foam. The restrictors 350, 352 impede the freefall of molten salt from the air separator 346, distribute momentum forces, and therefore prevent damage. Depending on the height of a downcomer in other embodiments, it may be advantageous to use several restrictors in the downcomer creating a cascading flow from restrictor to restrictor.

Passive flow restrictors used in the present invention are not actively controlled like an active drag valve, such as those previously described in conjunction with FIG. 2. Generally, this embodiment relieves the need to keep a full head in a downcomer and thus the need for a receiver outlet vessel. Accordingly, the control scheme of the present invention is simpler than previous control schemes. Additionally, a passive restrictor is not prone to inadvertent closure, as with a drag valve. Therefore, an outlet vessel, such as outlet vessel 230 (FIG. 2), need not maintain a free space volume upstream of the downcomer 231 (FIG. 2), 348 (FIG. 3). As such, the free space volume for cooling the receiver heat exchanger 316 can be shifted to the hot storage tank 322, which (i) has a far greater capacity for free space volume, (ii) can be vented to the atmosphere, and (iii) does not require precise level controls.

In the event of a loss of flow or low flow condition, a molten salt holding vessel 326 provides a supplemental flow of molten salt to the receiver heat exchanger 316. The holding vessel 326 is located atop the tower and approximately level to or below the receiver heat exchanger 316 and maintains a store of molten salt. Under normal pumped flow conditions, the holding vessel 326 is isolated from the flow of molten salt through the heat exchanger 316 by the normally closed and redundant isolation valves 340, 342. The isolation valves 340, 342 open upon a predetermined flow event, such as flow falling below a predetermined threshold. As illustrated, the isolation valves 340, 342 are redundant in order to permit flow from the holding vessel in the event that one isolation valve fails to open.

The level in the holding vessel 326 is generally maintained at an isolated volume adequate to provide approximately one minute of full flow through the receiver heat exchanger 316. One minute of flow typically permits enough time to redirect the heliostats from the receiver heat exchanger 316 to avoid overheating. Of course, the amount of time necessary to redirect heliostats from a receiver heat exchanger 316 may vary from system to system. Therefore, an appropriate volume of molten salt in a holding vessel 326 may be selected in order to provide cooling of the receiver heat exchanger 316 for the amount of time required to redirect the heliostats.

According to this embodiment, the redundant isolation valves 340, 342 are pneumatic operated valves, which are useful for this particular isolation application. However, other types of motive force may also be substituted, accordingly, for example solenoid, electric motors and other types of actuation mechanisms. The valves 340, 342 are designed to fail open to ensure that flow to the receiver heat exchanger 316 is not inhibited. As such, a pneumatic actuator or the like drives the valves 340, 342 shut and may either hold it shut or actively latch it shut. Upon the occurrence of a predetermined flow condition, the active shutting of valves 340, 342 is released and the valves drive open, generally by means of passive stored energy such as a spring or the like. The valves 340, 342 also drive open in the event that the actuator fails.

Figure 4:
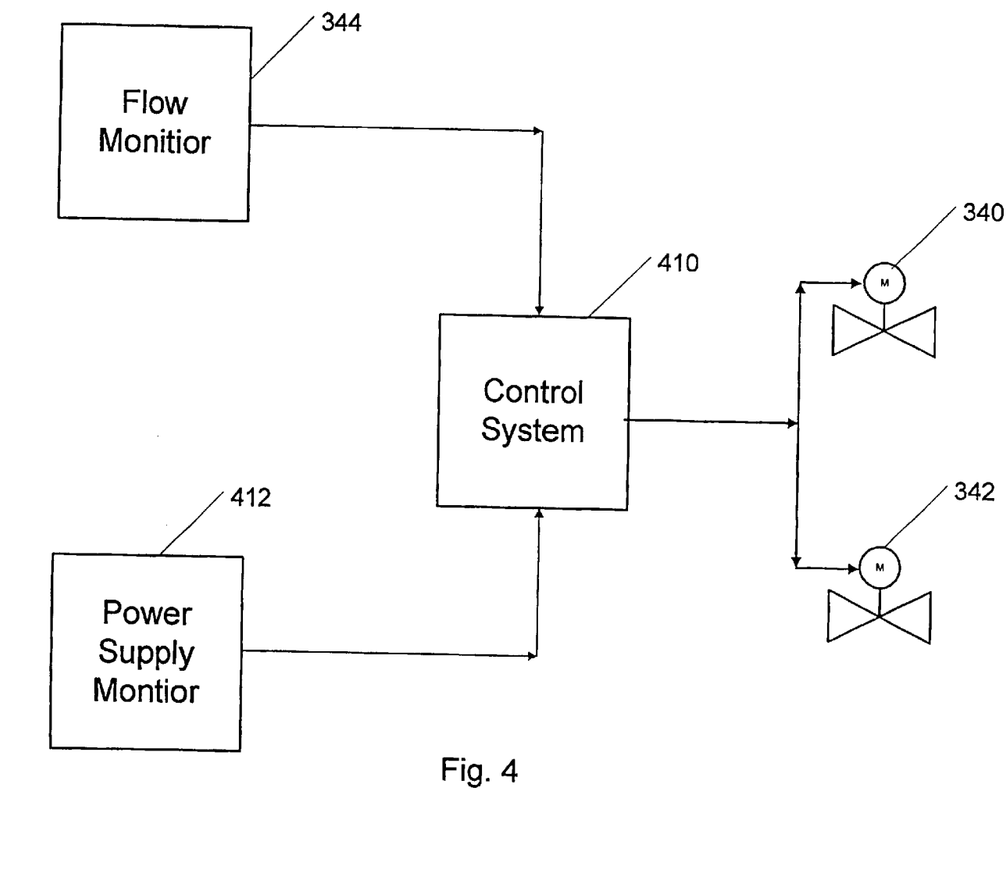
FIG. 4 is a block diagram of control functions of a valve control system for a molten salt receiver system holding vessel according to one embodiment of the present invention.

Referring now to FIG. 4 and with continued reference to FIG. 3, the isolation valves 340, 342 are controlled by a control system 410 that either keeps the isolation valves 340, 342 shut or permits them to drive open upon a predetermined flow condition. Two examples of predetermined flow conditions are shown. The first corresponds to the flow sensor 344 also shown in FIG. 3. The flow sensor 344 monitors flow from the pump 324 and communicates the present flow condition to the isolation valves 340, 342, or more typically, a control system 410 for controlling the isolation valves 340, 342. As such, when flow falls below a predetermined flow threshold the control system 410 will trigger the isolation valves 340, 342 to open and supply flow of molten salt to the receiver heat exchanger 316. Another predetermined flow condition corresponds to power to the pump 324. A pump power monitor 412, such as a relay or the like, provides a signal to the control system 410 indicating a loss of power to the pump 324, which then permits the isolation valves 340, 342 to open. These two flow conditions may be used independently of each other or in cooperation with each other, as desired. What has been described are two advantageous examples of isolation valve control. However, alternative flow or temperature conditions and methods of monitoring flow and temperature condition may be substituted accordingly, as will be recognized to those skilled in the art.

According to the embodiment shown in FIG. 3, the holding vessel 326, is also pressurized by way of a pressurization valve 354. Pressurization is accomplished by a supply of air or inert gas (not shown). Pressurization of the holding vessel 326 encourages flow from the holding vessel upon opening of the isolation valves 340, 342. The holding vessel pressurization system also comprises a vent valve 356 to permit selective venting of the holding vessel 326 such as, for example, to running vent system 360. Venting may be required upon filling the molten salt receiver system 300 and the holding vessel 326. The vent 356 is kept open until the desired level is reached. Isolation valves 340, 342 are then closed and the vessel 326 is pressurized to the desired pressure through the pressurization valve 354 and vent valve 356. Also included is an overpressure relief valve 358 that protects the vessel 326 from overpressurization. The overpressure relief 358 is typically passively controlled and the setpoint selected in order to avoid the maximum pressure limit of the vessel 326.

Both the vent valve 356 and the overpressure relief valve 358 are also interconnected to the running vent system 360. As previously described, the running vent system 360 is interconnected to and ultimately vents to the hot storage tank 322. As such, the vent system 360 advantageously provides a capacity to vent portions of the molten salt receiver system 300 without immediate discharge to the atmosphere, thereby avoiding inadvertent expulsion of molten salt to the atmosphere. Additionally, the vent system 360 is utilized for the initial fill of other elements of the molten salt receiver system 300 including the receiver heat exchanger 316. Vent valves (not shown) on the receiver heat exchanger 316 are also connected to the running vent system 360 and may be opened permitting the release of air while filling the receiver heat exchanger 316. Generally, the hot storage tank 322 is vented directly to atmosphere. However, free space in the hot storage tank 322 is adequate to avoid inadvertent spillage of molten salt. According to one embodiment of the present invention, the hot storage tank 322 may be sized to hold the entire volume of molten salt in the receiver system.

Figure 5:
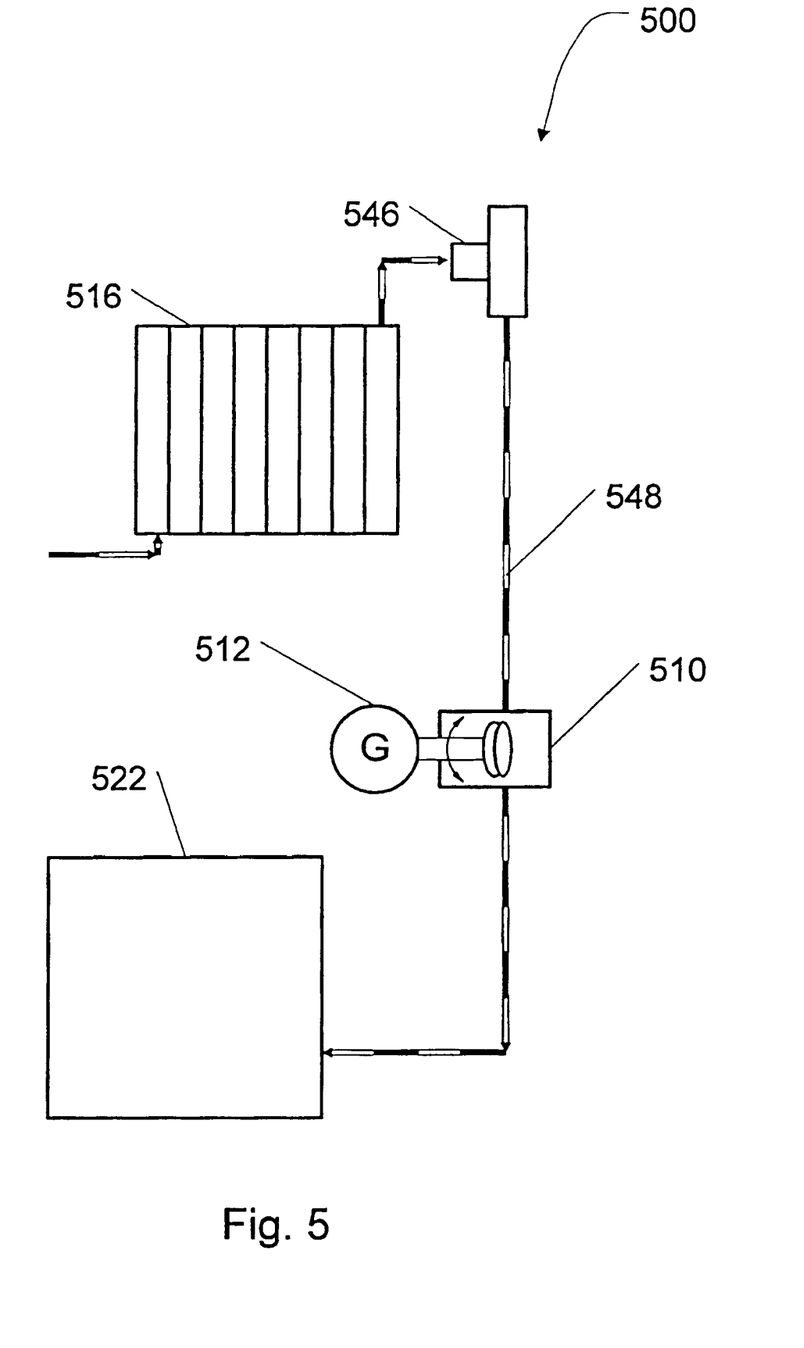
FIG. 5 is a simplified fluid communication diagram of a molten salt receiver heat exchanger, downcomer, and turbine generator according to an alternative embodiment of the present invention.

FIG. 5 illustrates an alternative embodiment of a molten salt receiver system 500 having a flow obstacle in the downcomer 548 comprising a turbine 510 connected to a generator 512. The molten salt receiver system is similar to the receiver system of FIG. 3, having a receiver heat exchanger 516, an air separator 546, a downcomer 548, and a hot storage tank 522. For purposes of explanation, other interconnections to the system are not shown, but may comprise similar interconnections to FIG. 3. The downcomer 548 provides flow of hot molten salt from the receiver heat exchanger 516 to the hot storage tank 522 for use in an energy generation system. In this embodiment, the turbine 510 is a flow obstacle that impedes flow through the downcomer 548, similar to the restrictors illustrated in FIG. 3 except that it converts potential energy into kinetic energy. As such, the generator 512 is connected to the turbine 510 and converts the kinetic energy of the molten salt flow to electrical energy, thus recovering kinetic energy of the molten salt flow through the downcomer 548. Alternatively, the generator 512 may be permitted to operate electrically unsynchronized allowing the turbine 510 to impede flow through the downcomer 548.

More generally, the embodiment of FIG. 5 relieves the need to keep a full head in a downcomer, and thus the need for a receiver outlet vessel, such as the outlet vessel 230 as illustrated in FIG. 2. Accordingly, the control scheme has been simplified. Additionally, a turbine is not prone to shut off flow as an active drag valve, such as described in conjunction with FIG. 2. A known embodiment of a turbine 510 may permit flow therethrough even when it is not rotating. For example, vents, through passages, or bypasses may be used to absorb salt momentum in the event the turbine 510 jams or it is not desired to rotate the turbine 510. Therefore, a receiver outlet vessel with a free space volume need not be maintained upstream of the downcomer. As such, a free space volume for assuring continued molten salt flow and for cooling the receiver heat exchanger has been shifted to a hot storage tank that (i) has a far greater capacity for free space volume, (ii) can be vented to the atmosphere, and (iii) does not require precise level controls.

It will be noted by the skilled artisan that common fluid elements, such as pumps, valves, piping, turbines, heat exchangers, etc., that are used herein are preferably designed for use in a molten salt receiver system. The constraints of molten salt receiver systems require operability at temperatures up to 1100° F. and in a highly corrosive environment. As such, the elements of a molten salt receiver system described herein will employ materials and require design to withstand the environment. Additionally, the particular flow characteristics, mass transfer capabilities, and heat transfer capabilities will vaty according to the design requirements of each molten salt receiver system. Also, molten salt solidifies at temperatures much higher than ambient temperatures, and vessels, tanks, or other elements that store molten salt will require heating elements capable of maintaining the molten salt in a liquid state. Accordingly, these and other system requirements are common to and applicable to the molten salt receiver system of the present invention. As such, previously designed elements common to molten salt receiver systems will be understood and recognized by one of ordinary skill in the art as applied to the present invention.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for cooling a receiver heat exchanger of a molten salt receiver system, comprising:
    a molten salt holding vessel;
    a receiver heat exchanger having an inlet downstream of the holding vessel and an outlet, the inlet and outlet permitting flow of molten salt through the heat exchanger;
    an air separator having an inlet downstream of the receiver heat exchanger and an outlet, the air separator permitting the release of air entrained in the molten salt flow from the receiver heat exchanger;
    a downcomer downstream of the air separator outlet and capable of delivering molten salt to a molten salt energy generation system; and
    at least one flow obstacle within the downcomer.

2. The system according to claim 1, wherein the at least one flow obstacle comprises a passive flow restrictor.

3. The system according to claim 2, wherein the passive flow restrictor is selected from the group consisting of an orifice, a baffle, and open cell metal foam.

4. The system according to claim 1, wherein the flow obstacle is a turbine.

5. The system according to claim 4, wherein the turbine comprises a turbine generator.

6. The system according to claim 1, further comprising at least one isolation valve connecting the holding vessel and the receiver heat exchanger, the isolation valve capable of automatically opening upon a predetermined flow condition.

7. The system according to claim 6, further comprising a hot molten salt storage tank downstream of the downcomer and capable of delivering molten salt to a molten salt energy generation system.

8. The system according to claim 7, further comprising a vent system connecting the air separator and the hot molten salt storage tank.

9. The system according to claim 6, further comprising a pressurization system connected to the holding vessel and adapted to permit selective pressurization of the holding vessel.

10. The system according to claim 9, wherein the pressurization system further comprises an overpressure relief.

11. The system according to claim 6, further comprising a controller for automatically opening the isolation valve upon the flow through the receiver heat exchanger falling below a predefined threshold.

12. The system according to claim 11, further comprising a flow sensor interconnected to the controller and adapted to sense flow through the receiver heat exchanger, wherein the controller automatically opens the isolation valve in response to a signal from the flow sensor.

13. The system according to claim 6, wherein the holding vessel has a capacity that permits filling the vessel with a volume of molten salt corresponding to a volume required to cool the receiver heat exchanger for at least one minute upon opening of the isolation valve.

14. The system according to claim 6, further comprising:
    a molten salt source;
    a pump adapted to receive molten salt from the molten salt source and to urge flow through the receiver heat exchanger, the outlet of the pump being interconnected to the outlet of the holding vessel;
    a check valve for preventing reverse flow through the pump; and
    a flow control valve downstream of the pump.

15. The system according to claim 14, wherein the molten salt source comprises a cold molten salt storage tank.

16. The system according to claim 14, wherein the isolation valve automatically opens upon the predetermined flow condition corresponding to a loss of power to the pump.

17. A molten salt receiver system, comprising:
    a molten salt source;
    a pump adapted to receive molten salt from the molten salt source and to urge flow of the molten salt;
    a receiver heat exchanger having an inlet downstream of the pump and an outlet, the inlet and outlet permitting flow of molten salt through the heat exchanger;
    a flow control valve downstream of the pump;
    a molten salt holding vessel having an outlet interconnected downstream of the pump and upstream of the heat exchanger;
    an air separator having an inlet downstream of the heat exchanger and an outlet, the air separator permitting the release of air entrained in the molten salt flow from the receiver heat exchanger;
    a downcomer downstream of the air separator outlet for receiving molten salt flow therefrom;
    at least one flow obstacle within the downcomer; and
    a hot molten salt storage tank downstream of the air separator outlet for receiving molten salt flow from the downcomer.

18. The system according to claim 17, further comprising at least one isolation valve positioned to isolate the holding vessel outlet from the flow of molten salt between the pump and the receiver heat exchanger, the isolation valve also being capable of automatically opening upon a predetermined flow condition.

19. The system according to claim 18, further comprising a check valve positioned between the pump and the receiver heat exchanger for preventing reverse flow through the pump.

20. The system according to claim 17, wherein the at least one flow obstacle comprises a passive flow restrictor.

21. The system according to claim 20, wherein the passive flow restrictor is selected from the group consisting of an orifice, a baffle, and open cell metal foam.

22. The system according to claim 17, wherein the flow obstacle is a turbine.

23. The system according to claim 22, wherein the turbine comprises a turbine generator.

24. The system according to claim 17, further comprising a vent system connecting the air separator and the hot molten salt storage tank.

25. The system according to claim 17, further comprising a pressurization system connected to the holding vessel and adapted to permit selective pressurization of the holding vessel.

26. The system according to claim 25, wherein the pressurization system further comprises an overpressure relief.

27. The system according to claim 17, further comprising a controller for automatically opening the isolation valve upon the predetermined flow condition corresponding to a loss of power to the pump.

28. The system according to claim 17, further comprising a controller for automatically opening the isolation valve upon the flow through the receiver heat exchanger falling below a predefined threshold.

29. The system according to claim 28, further comprising a flow sensor adapted to sense flow through the receiver heat exchanger, wherein the isolation valve automatically opens in response to a signal from the flow sensor.

30. The system according to claim 17, wherein the holding vessel has a capacity that permits filling the holding vessel with a volume of molten salt corresponding a volume required to cool the receiver heat exchanger for at least one minute upon opening of the isolation valve.

31. The system according to claim 17, wherein the molten salt source comprises a cold storage tank.

32. A method for cooling a receiver heat exchanger of a molten salt receiver system comprising:

permitting flow of molten salt through the receiver heat exchanger;

releasing air entrained in the flow of molten salt after the molten salt has passed through the receiver heat exchanger;

delivering the molten salt to a molten salt energy generation system after releasing the entrained air therefrom;

monitoring the flow of molten salt to detect an occurrence of a predetermined flow condition; and automatically supplementing the flow of molten salt to the receiver heat exchanger with molten salt from a molten salt holding vessel upon the detection of the occurrence of the predetermined flow condition.

33. The method according to claim 32, wherein the step of automatically supplementing flow is initiated by automatically opening a valve isolating the molten salt holding vessel.

34. The method according to claim 33, wherein the step of monitoring includes monitoring flow through the receiver heat exchanger to detect the predetermined flow condition corresponding to flow falling below a predefined threshold.

35. The method according to claim 33, wherein the step of monitoring includes monitoring an electric pump power supply to detect the predetermined flow condition corresponding to loss of power to the electric pump.

36. The method according to claim 32, wherein the step of automatically supplementing flow lasts at least one minute.

37. The method according to claim 36, further comprising filling the molten salt holding vessel to a level corresponding to a volume required during the step of automatically supplementing flow.

38. The method according to claim 32, wherein the step of delivering molten salt includes passively restricting flow of molten salt.

* * * * *